United States Patent
Auden

(10) Patent No.: US 10,017,215 B2
(45) Date of Patent: Jul. 10, 2018

(54) VEHICLE DIRECTIONAL CONTROL VIA AERODYNAMIC FORCES

(71) Applicant: GM GLOBAL TECHNOLOGY OPERATIONS LLC, Detroit, MI (US)

(72) Inventor: Joshua R. Auden, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/681,961

(22) Filed: Apr. 8, 2015

(65) Prior Publication Data

US 2016/0297477 A1    Oct. 13, 2016

(51) Int. Cl.
*B62D 15/02* (2006.01)
*B62D 5/06* (2006.01)
*B62D 6/00* (2006.01)
*B62D 37/02* (2006.01)
*B62D 37/00* (2006.01)

(52) U.S. Cl.
CPC .............. *B62D 37/02* (2013.01); *B62D 6/003* (2013.01); *B62D 37/00* (2013.01)

(58) Field of Classification Search
CPC ....... B63H 25/02; B63H 25/06; B60W 40/114
USPC .......... 701/41–42, 423, 410; 180/6, 44, 444, 180/422, 443; 340/435, 905; 455/456.1
See application file for complete search history.

(56) References Cited

U.S. PATENT DOCUMENTS

| | | | | |
|---|---|---|---|---|
| 6,931,313 B2* | 8/2005 | Kato | ........................ | B60T 8/172 180/443 |
| 8,346,408 B2* | 1/2013 | Ratliff | .................... | G05D 1/101 244/185 |
| 9,533,681 B2* | 1/2017 | Kodaira | ............... | B62D 15/025 |
| 9,630,621 B2* | 4/2017 | Kurata | ................. | B62D 15/025 |
| 2004/0230353 A1* | 11/2004 | Villaume | ............. | G05D 1/0808 701/3 |
| 2005/0071061 A1* | 3/2005 | Kato | ....................... | B60T 8/172 701/41 |

(Continued)

FOREIGN PATENT DOCUMENTS

| | | |
|---|---|---|
| CN | 102556105 A | 7/2012 |
| CN | 104097701 A | 10/2014 |
| DE | 102011121538 A1 | 8/2012 |

OTHER PUBLICATIONS

Autonomous ground vehicle control system for high-speed and safe operation; Junmin Wang; Joe Steiber; Bapiraju Surampudi;2008 American Control Conference; Year: 2008; pp. 218-223, DOI: 10.1109/ACC.2008.4586494.*

(Continued)

*Primary Examiner* — Cuong H Nguyen
(74) *Attorney, Agent, or Firm* — Lorenz & Kopf, LLP

(57) ABSTRACT

Methods, systems, and vehicles are provided for controlling a direction of a vehicle using aerodynamic forces. A rudder is positioned on a body of the vehicle. A control system is coupled to the rudder, and comprises a detection unit and a processor. The detection unit is configured to obtain sensor data for the vehicle. The processor is coupled to the detection unit, and is configured to at least facilitate obtaining a measured yaw rate for the vehicle using the sensor data, determining an intended yaw rate for the vehicle using the sensor data, and moving the rudder based at least in part on a comparison between the measured yaw rate and the intended yaw rate.

17 Claims, 4 Drawing Sheets

(56) References Cited

U.S. PATENT DOCUMENTS

| | | | | |
|---|---|---|---|---|
| 2007/0151795 | A1* | 7/2007 | Chino | F16D 41/067 180/444 |
| 2010/0102173 | A1* | 4/2010 | Everett | B60T 8/1703 244/175 |
| 2010/0106380 | A1* | 4/2010 | Salari | B62D 35/001 701/49 |
| 2010/0223006 | A1* | 9/2010 | Sasaki | G01C 21/26 701/533 |
| 2015/0224845 | A1* | 8/2015 | Anderson | B60G 17/019 701/37 |
| 2015/0291214 | A1* | 10/2015 | Mitsumoto | B62D 6/002 701/41 |
| 2015/0298691 | A1* | 10/2015 | Kodaira | B62D 15/025 701/48 |
| 2016/0187140 | A1* | 6/2016 | Clarke | H04L 63/083 701/25 |
| 2016/0347311 | A1* | 12/2016 | Kurata | B62D 15/025 |
| 2017/0277189 | A1* | 9/2017 | Johnson | G05D 1/0206 |
| 2017/0300056 | A1* | 10/2017 | Johnson | G05D 1/0206 |

OTHER PUBLICATIONS

Control of Four-Wheel-Steering Vehicle Using GA Fuzzy Neural Network; Shijing Wu; Enyong Zhu; Ming Qin; Hui Ren; Zhipeng Lei Intelligent Computation Technology and Automation (ICICTA), 2008 International Conference on; Year: 2008, vol. 1, pp. 869-873, DOI: 10.1109/ICICTA.2008.237.*

Direct yaw-moment control of electric vehicle based on cornering stiffness estimation; H. Fujimoto; A. Tsumasaka; T. Noguchi 31st Annual Conference of IEEE Industrial Electronics Society, 2005. IECON 2005; Year: 2005; p. 6 pp., DOI: 10.1109/IECON.2005. 1569321.*

Study on design method of ideal steering ratios of vehicle steer-by-wire system; Li Gang; Li Ning; Wang Guanyi; Ma Gaofeng ; Mechatronics and Control (ICMC), 2014 International Conference on; Year: 2014; pp. 128-131, DOI: 10.1109/ICMC.2014.7231532.*

The self driving car that can also FLY, Mark Prigg of Dailymail. com, published Mar. 16, 2015.*

Understeer and oversteer balance: the mechanics behind it, and 3 ways in which it is affected by suspension, published on Jan. 21, 2015 on http://www.wallpaperup.com.*

A comparative study of different yaw stability control strategies with different road condition and handling maneuver; Subhra Chandan Behera; Debasish Mohapatra; G. K Choudhary; Gaurav Chaudhary; 2016 International Conference on Automatic Control and Dynamic Optimization Techniques (ICACDOT); Year: 2016; pp. 1036-1041.*

Two-stage adaptive sliding-mode controller for vehicle yaw stability using differential ABS; Sachidananda Sen; Shouvik Chakraborty; Abhishek Dhar; Ashoke Sutradhar; 2016 IEEE First International Conference on Control, Measurement and Instrumentation (CMI); Year: 2016; pp. 31-35;.*

Estimation of vehicle yaw rate and lateral motion for dynamic stability control using unscented Kalman filtering (UKF) approach Sachidananda Sen; Shouvik Chakraborty; Ashoke Sutradhar; Michael Faraday IET International Summit 2015; Year: 2015 pp. 24-29.*

Precise Localization of an Autonomous Car Based on Probabilistic Noise Models of Road Surface Marker Features Using Multiple Cameras; Kichun Jo; Yongwoo Jo; Jae Kyu Suhr; Ho Gi Jung; Myoungho Sunwoo; IEEE Transactions on Intelligent Transportation Systems; Year: 2015, Volume: 16, Issue: 6; pp. 3377-3392.*

Human-Centered Feed-Forward Control of a Vehicle Steering System Based on a Driver's Path-Following Characteristics Wenshuo Wang et al.; IEEE Transactions on Intelligent Transportation Systems; year: 2017, vol. 18, Issue: 6; pp. 1440-1453. (Year: 2017).*

An adaptive fuzzy PID control strategy for vehicle yaw stability; ShengHui Pan; HuangQian Zhou; 2017 IEEE 2nd Information Technology, Networking, Electronic and Automation Control Conference (ITNEC); Year: 2017; pp. 642-646. (Year: 2017).*

Development of Zero Turning Radius by using different independent torque; Muhammad Asyraf Shahrom; Mohamad Heerwan Peeie; 2017 3rd International Conference on Control, Automation and Robotics (ICCAR); Year: 2017; pp. 647-650. (Year: 2017).*

State Intellectual Property Office of the People's Republic of China, Office Action in Chinese Patent Application No. 201610215278.X dated Nov. 24, 2017.

* cited by examiner

VEHICLE DIRECTIONAL CONTROL VIA AERODYNAMIC FORCES

TECHNICAL FIELD

The present disclosure generally relates to vehicles, and more particularly relates to methods and systems for controlling vehicle direction using aerodynamic forces.

BACKGROUND

Many vehicles today utilize techniques for direction control. For example, in situations in which a vehicle may be experiencing understeer or oversteer conditions, certain vehicles today may implement stability control braking intervention and/or electronic limited slip differential to correct the understeer or oversteer conditions. However, such existing techniques may not always be optimal in all situations, for example because such techniques may slow down the vehicle.

Accordingly, it is desirable to provide improved techniques for direction control, for example when a vehicle may be experiencing an understeer or oversteer condition. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises obtaining a measured yaw rate for a vehicle, determining an intended yaw rate for the vehicle, and moving a rudder of the vehicle, via instructions provided by a processor, based at least in part on a comparison between the measured yaw rate and the intended yaw rate.

In accordance with an exemplary embodiment, a system is provided. The system comprises a detection unit and a processor. The detection unit is configured to obtain sensor data for a vehicle. The processor is coupled to the detection unit, and is configured to at least facilitate obtaining a measured yaw rate for the vehicle using the sensor data, determining an intended yaw rate for the vehicle using the sensor data, and moving a rudder of the vehicle based at least in part on a comparison between the measured yaw rate and the intended yaw rate.

In accordance with a further exemplary embodiment, a vehicle is provided. The vehicle comprises a body, a rudder, and a control system. The rudder is positioned on the body. The control system is coupled to the rudder, and comprises a detection unit and a processor. The detection unit is configured to obtain sensor data for the vehicle. The processor is coupled to the detection unit, and is configured to at least facilitate obtaining a measured yaw rate for the vehicle using the sensor data, determining an intended yaw rate for the vehicle using the sensor data, and moving the rudder based at least in part on a comparison between the measured yaw rate and the intended yaw rate.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
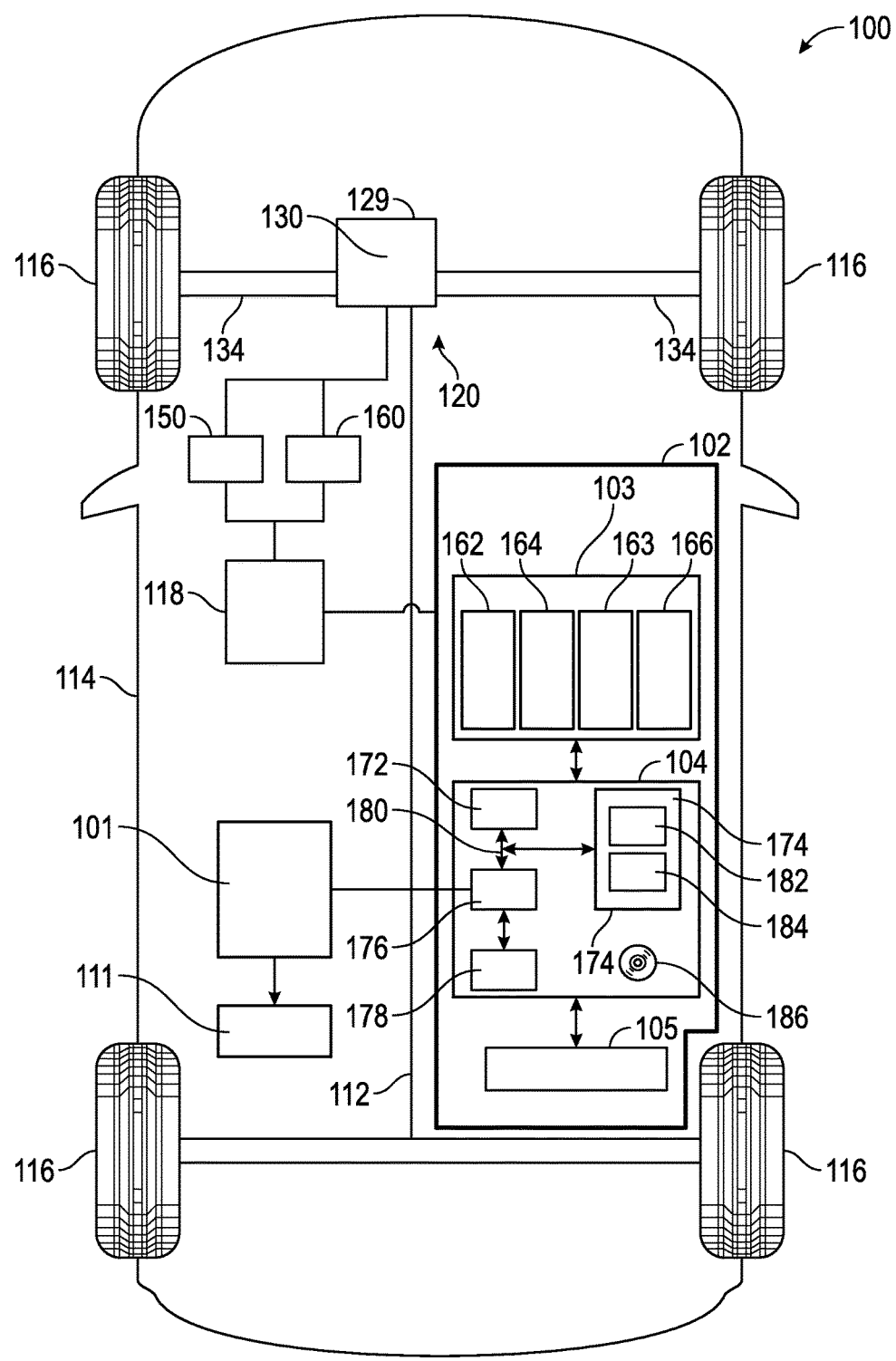
FIG. 1 is a functional block diagram of a vehicle that includes a rudder and a control system for controlling the runner, for use in controlling vehicle direction (e.g. yaw rate, understeer, and oversteer) using aerodynamic forces, in accordance with an exemplary embodiment.

FIG. 1 illustrates a vehicle 100, or automobile, according to an exemplary embodiment. As described in greater detail further below, the vehicle 100 includes a rudder 101, along with a control system 102 for the rudder 101, for controlling vehicle direction using aerodynamic forces. In various embodiments, the vehicle 100 comprises a land vehicle. In certain preferred embodiments, the vehicle 100 comprises an automotive vehicle, such as an automobile, truck, bus, and/or sedan as driven on highways, roads, and/or other roadways.

In one embodiment, the rudder 101 is disposed on a rear portion of the vehicle 100, for example where a spoiler would typically be placed. Also in one embodiment, in one embodiment, the rudder 101 is mounted along a bumper beam 111 of the vehicle 100. However, this may vary in other embodiments.

The control system 102 selectively moves the rudder 101 between different positions to utilize aerodynamic forces to correct understeer and oversteer for the vehicle 100, based on the vehicle 100's actual yaw rate, a driver's intended yaw rate for the vehicle 100, and a speed of the vehicle 100, in accordance with the steps of the process 200 of FIG. 2, as discussed further below. Examples of the placement and positional movement of the rudder 101 are further illustrated in FIGS. 4-6 and discussed further below in connection therewith, as well as in connection with the discussion of FIGS. 2 and 3 further below. In addition, as discussed further below in connection with FIG. 1, in the depicted embodiment the control system 102 includes a sensor array 103, a controller 104, and an actuator 105.

As depicted in FIG. 1, the vehicle 100 includes, in addition to the above-referenced rudder 101 and control system 102, a chassis 112, a body 114, four wheels 116, an electronic control system 118, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

In various embodiments the vehicle 100 may differ from that depicted in FIG. 1. For example, in certain embodiments the number of wheels 116 may vary.

In the exemplary embodiment illustrated in FIG. 1, the vehicle 100 includes an actuator assembly 120. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. The steering system 150 includes a steering wheel and a steering column (not depicted). The steering wheel receives inputs from a driver of the vehicle 100. The steering column results in desired steering angles for the wheels 116 via the drive shafts 134 based on the inputs from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lighting units, navigation systems, and the like (also not depicted). Similar to the discussion above regarding possible variations for the vehicle 100, in certain embodiments steering, braking, and/or acceleration can be commanded by a computer instead of by a driver.

The control system 102 is mounted on the chassis 112. As discussed above, the control system 102 estimates movement of the vehicle 100 using radar data with respect to stationary objects in proximity to the vehicle 100, and includes a sensor array 103 and a controller 104.

The sensor array 103 includes various sensors (also referred to herein as sensor units) that are utilized by the control system 102 for controlling direction for the vehicle 100 via movement of the rudder 101. In the depicted embodiment, the sensor array 103 includes one or more vehicle ignition sensors 162, steering sensors 163, speed sensors 164, and yaw sensors 166. The ignition sensors 162 detect whether an ignition system of the vehicle 100 is on or off. The steering sensors 163 are used for measuring a steering angle for the steering system 150 of the vehicle 100 (e.g. an angle of the steering wheel and/or steering column of the vehicle 100). The speed sensors 164 are used to measure a speed of the vehicle and/or data used for calculating the wheel speed (e.g. wheel speed sensors 164 for measuring wheel speed for use by the controller 104 in calculating the vehicle speed, in one embodiment). The yaw sensors 166 measure a yaw rate of the vehicle 100. The measurements and information from the various sensors of the sensor array 103 are provided to the controller 104 for processing.

The controller 104 is coupled, directly or indirectly, to the rudder 101, and controls movement of the rudder 101 based on the data from the sensor array 103, for controlling direction of the vehicle 100 (e.g. to correct an understeer or oversteer condition). In the depicted embodiment, the controller 104 is coupled to the sensor array 103 and to the actuator 105. The actuator 105 moves the rudder 101 based on instructions provided by the controller 104. In one embodiment, the actuator 105 comprises an electric actuator. In another embodiment, the actuator 105 comprises a hydraulic actuator. However, this may vary in other embodiments.

As indicated above, the controller 104 utilizes the various measurements and information from the sensor array 103 for controlling movement of the rudder 101 via instructions provided to the actuator 105, for controlling direction of the vehicle 100 using aerodynamic forces (e.g. to correct an understeer or oversteer condition). Specifically, the controller 104 determines an actual yaw rate of the vehicle 100 (e.g., from the data provided by the yaw sensors 166) as well as a driver intended yaw rate for the vehicle 100 (e.g., from the data provided by the steering sensors 163), and controls the rudder 101 based on a comparison of the actual versus driver intended yaw rates (and, in certain embodiments, based on one or more other parameters, such as a speed of the vehicle, for example as determined provided by the speed sensors 164). In certain embodiments, the controller 104, along with the rudder 101, the sensor array 103, and the actuator 105 provide these and other functions in accordance with the process 200 described further below in connections with FIGS. 2-6.

As depicted in FIG. 1, the controller 104 comprises a computer system. In certain embodiments, the controller 104 may also include one or more of the sensors of the sensor array 103, one or more other devices and/or systems, and/or components thereof. In addition, it will be appreciated that the controller 104 may otherwise differ from the embodiment depicted in FIG. 1. For example, the controller 104 may be coupled to or may otherwise utilize one or more remote computer systems and/or other control systems, such as the electronic control system 118 of FIG. 1.

In the depicted embodiment, the computer system of the controller 104 includes a processor 172, a memory 174, an interface 176, a storage device 178, and a bus 180. The processor 172 performs the computation and control functions of the controller 104, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 104 and the computer system of the controller 104, generally in executing the processes described herein, such as the process 200 described further below in connection with FIGS. 2-6.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184 (e.g., a stored model and/or other values) for use in executing the functions of the controller 104.

The bus 180 serves to transmit programs, data, status and other information or signals between the various components of the computer system of the controller 104. The interface 176 allows communication to the computer system of the controller 104, for example from a system driver and/or another computer system, and can be implemented using any suitable method and apparatus. In one embodiment, the interface 176 obtains the various data from the sensors of the sensor array 103. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps of the process 200 (and any sub-processes thereof) described further below in connection with FIGS. 2-6. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 104 may also otherwise differ from the embodiment depicted in FIG. 1, for example in that the computer system of the controller 104 may be coupled to or may otherwise utilize one or more remote computer systems and/or other control systems.

While the sensor array 103, the controller 104, and that actuator 105 are depicted as being part of the same system, it will be appreciated that in certain embodiments these features may comprise two or more systems. In addition, in various embodiments the control system 102 may comprise all or part of, and/or may be coupled to, various other vehicle devices and systems, such as, among others, the rudder 101, the bumper beam 111, the actuator assembly 120, the electronic control system 118, and/or the steering system 150.

Figure 2:
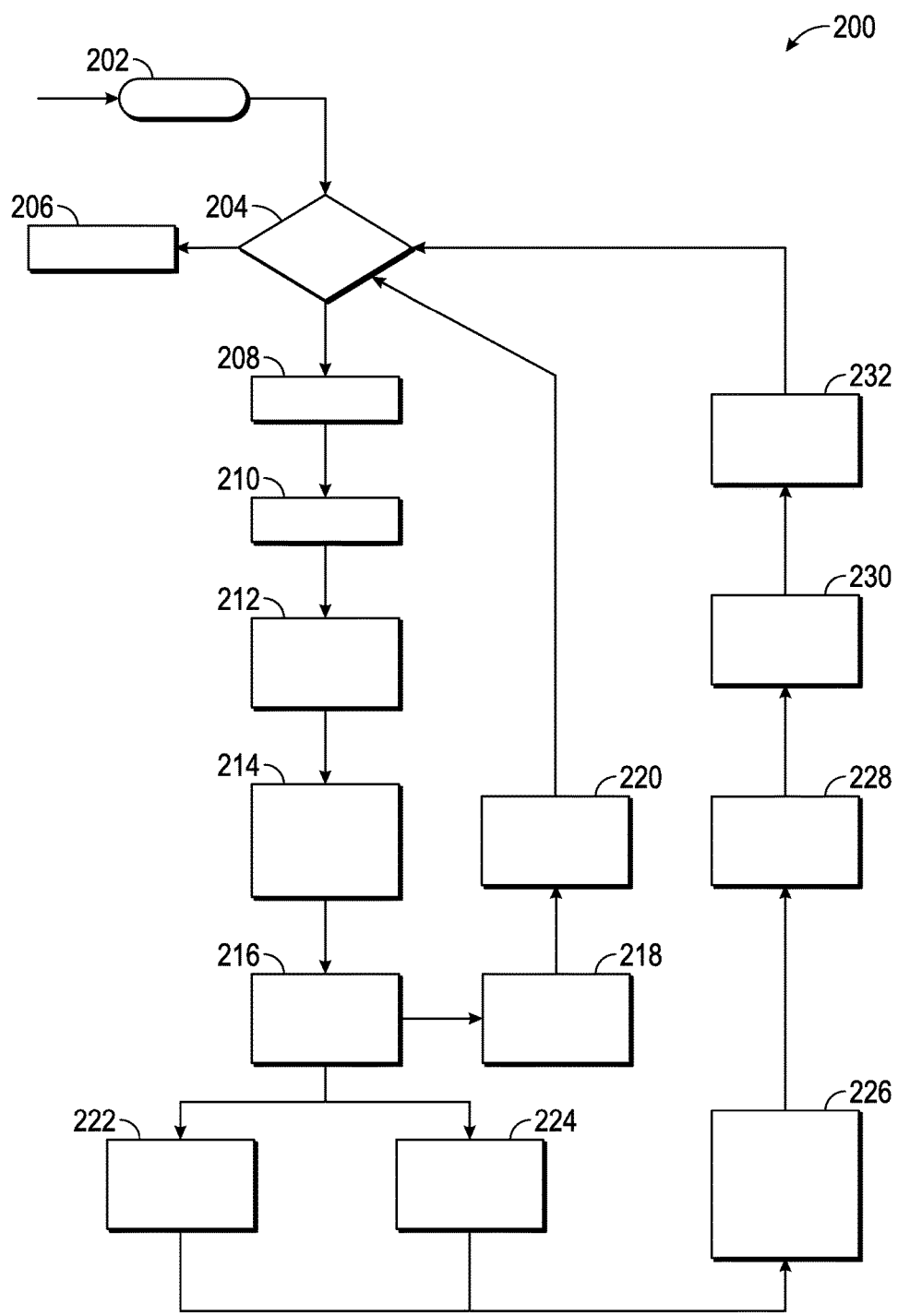
FIG. 2 is a flowchart of a process for controlling vehicle direction using aerodynamic forces, and that can be used in conjunction with the vehicle of FIG. 1, in accordance with an exemplary embodiments.

FIG. 2 is a flowchart of a process 200 for controlling vehicle direction using aerodynamic forces, in accordance with an exemplary embodiment. The process 200 can be implemented in connection with the vehicle 100, including the rudder 101 and the control system 102 thereof, in accordance with one embodiment. In addition, the process 200 is also discussed below in connection with FIG. 3 (which provides an exemplary implementation of the process 200 in correcting an understeer or oversteer condition) as well as FIGS. 4-6 (which provide illustrations of exemplary positional movements of the rudder to control vehicle direction in accordance with the steps of the process 200 of FIG. 2), in accordance with exemplary embodiments.

As depicted in FIG. 2, the process 200 is initiated at step 202. In one embodiment, the steps of the process 200 repeat, preferably continuously, throughout an ignition cycle or vehicle drive for the vehicle, in which the vehicle is being operated.

A determination is made as to whether an ignition of the vehicle is turned on (step 204). In one embodiment, this determination is made by the processor 172 of FIG. 1 based on measurements provided by the ignition sensors 162 of FIG. 1.

If it is determined that the vehicle ignition is not turned on, then the directional control of the process 200 is inactive (step 206). In one embodiment, during step 206, the direction control remains inactive while the determination of step 204 repeats, until a subsequent determination is made in an iteration of step 204 that the vehicle ignition is turned on.

Once it is determined that the vehicle ignition is turned on, a speed of the vehicle is obtained or determined (step 208). In one embodiment, the vehicle speed is determined by the processor 172 of FIG. 1 using one or more measurements from the speed sensors 164 of FIG. 1 (e.g. wheel speed sensors). In certain other embodiments, one or more other different types of systems, sensors, and/or techniques may be utilized (e.g., using data from a vehicle accelerometer and/or a global positioning system (GPS)).

A steering angle is also obtained or determined (step 210). In one embodiment, the steering angle is obtained or determined by the processor 172 of FIG. 1 using one or more measurements from the steering sensors 163 of FIG. 1. In one such embodiment, the steering angle comprises a steering wheel angle as measured by a steering wheel sensor.

A measured yaw rate for the vehicle is obtained or determined (step 212). In one embodiment, the measured yaw rate is measured by one or more yaw sensors 166 of FIG. 1 and provided to the processor 172 of FIG. 1. In one embodiment, the measured yaw rate comprises an actual yaw rate for the vehicle as it is being driven during a current ignition cycle or vehicle drive.

A driver-intended yaw rate is determined (step 214). In one embodiment, the driver-intended yaw rate comprises a yaw rate for the vehicle that would correspond to or be consistent with travel of the vehicle in accordance with inputs provided by an operator of the vehicle (e.g., a yaw rate consistent with the driver's application of the steering wheel). In one embodiment, the driver-intended yaw rate is calculated by the processor 172 of FIG. 1 based on information provided by the sensor array 103 of FIG. 1. In one such embodiment, the processor 172 calculates the driver intended yaw rate using the steering angle of step 210 (e.g.

a steering wheel angle) along with a model stored in the memory 174 of FIG. 1 as one of the stored values 184 thereof (e.g. a vehicle dynamics bicycle model). In one embodiment, the driver's intended yaw rate is calculated from the steering wheel angle and vehicle speed. In one embodiment, the vehicle's normal yaw response to a steering input at a particular vehicle speed is characterized through a series of maneuvers to determine an overall response map that encompasses the full range of steering angle and vehicle speed inputs. Also in one embodiment, this response map is then used to determine the driver's intended yaw response based on steering wheel input and vehicle speed by referencing a calibration table.

In step 216, a comparison is made regarding the measured yaw rate of step 212 and the driver intended yaw rate of step 214. In one embodiment, this comparison is made by the processor 172 of FIG. 1.

If it is determined in step 216 that the measured yaw rate of step 212 is equal to the driver intended yaw rate of step 214 (or, in certain embodiments, that an absolute value of the difference between the measured yaw rate and the driver intended yaw rate is less than a predetermined threshold), then it is determined that the rudder 101 of FIG. 1 is not presently needed for directional adjustment for the vehicle 100 (step 218). In one embodiment, this determination is made by the processor 172 of FIG. 1. The rudder 101 is maintained accordingly in a nominal position (step 220). In one embodiment, the nominal position is one in which the rudder 101 causes little or no change to the yaw rate for the vehicle 100 (for example, corresponding to the first position 402 depicted in FIGS. 4-6, discussed further below). In one embodiment, to the extent that the rudder 101 may have presently been in another position other than the nominal position (e.g. via placement in a prior iteration of step 232), then the rudder 101 would then be returned to the nominal position during step 220 (in one embodiment, based on instructions provided by the processor 172 to the actuator 105 of FIG. 1). In one embodiment, the process returns to step 204 and repeats with a new iteration.

Returning to step 216, if it is determined in step 216 that the measured yaw rate of step 212 is greater than the driver intended yaw rate of step 214 (or, in certain embodiments, that the measured yaw rate is greater than the driver intended yaw rate by at least a predetermined amount or percentage), then it is determined that the rudder 101 of FIG. 1 is needed for directional adjustment for the vehicle 100 in the form of yaw dampening (step 222) (for example, to correct an oversteer condition for the vehicle 100). Specifically, in one embodiment, the rudder 101 of FIG. 1 is moved toward the second position 502 depicted in FIG. 5 (discussed further below) to correct for the oversteer condition. In one embodiment, this determination is made by the processor 172 of FIG. 1. The process then proceeds to step 226, discussed further below.

Conversely, if it is determined in step 216 that the measured yaw rate of step 212 is less than the driver intended yaw rate of step 214 (or, in certain embodiments, that the measured yaw rate is less than the driver intended yaw rate by at least a predetermined amount or percentage), then it is determined that the rudder 101 of FIG. 1 is needed for directional adjustment for the vehicle 100 in the form of yaw increase or acceleration (step 224) (for example, to correct an understeer condition for the vehicle 100). Specifically, in one embodiment, the rudder 101 of FIG. 1 is moved toward the third position 602 depicted in FIG. 6 to correct for the understeer condition. In one embodiment, this determination is made by the processor 172 of FIG. 1. The process then proceeds to step 226, discussed directly below.

During step 226, a gain factor is determined for the adjustment of the rudder in implementing the determination of step 222 or step 224. Specifically, in one embodiment, the gain factor determines a magnitude of the adjustment from step 222 (i.e., the magnitude of the yaw dampening to correct an oversteer condition of step 222) or step 224 (i.e., the magnitude of the yaw increase or acceleration to correct an understeer condition of step 224). In one embodiment, the gain factor is determined by the processor 172 of FIG. 1 using a calibration table that is stored in the memory 174 of FIG. 1 in the stored values 184 thereof.

Also in one embodiment, the vehicle speed is used along with the size of the difference between the measured yaw rate versus the driver intended yaw rate to determine the amount of the gain, as part of the calibration table. In various embodiments, a larger vehicle speed results in a larger gain in step 226, all other factors being equal (and with a smaller vehicle speed resulting in a relatively smaller gain, other factors held constant). Also in various embodiments, a larger difference between the measured yaw rate versus the driver-intended yaw rate results in a larger gain in step 226, all other factors being equal (and with a smaller difference resulting in a relatively smaller gain, other factors held constant).

For example, in one embodiment, a relatively large amount of yaw dampening (e.g. with a relatively larger gain) is provided when the measured yaw rate is significantly greater than the driver intended yaw rate and the vehicle speed is relatively large. Yaw dampening will still be provided, but in a relatively smaller amount (e.g. with a relatively smaller gain) when the measured yaw rate is greater than the driver intended yaw rate by a relatively smaller amount and/or when the vehicle speed is relatively smaller.

Similarly, in one embodiment, a relatively large amount of yaw rate increase or acceleration (e.g. with a relatively larger gain) is provided when the measured yaw rate is significantly less than the driver intended yaw rate and the vehicle speed is relatively large. Yaw rate increase or acceleration will still be provided, but in a relatively smaller amount (e.g. with a relatively smaller gain) when the measured yaw rate is less than the driver intended yaw rate by a relatively smaller amount (i.e., when the absolute value of the difference between the respective yaw rates is relatively smaller) and/or when the vehicle speed is relatively smaller.

The rudder 101 of FIG. 1 is then adjusted in accordance with the determinations of steps 222-226, to thereby control the direction of the vehicle 100 of FIG. 1 using aerodynamic forces. Specifically, in one embodiment, a rudder position command is generated (step 228). In one embodiment, the rudder position command represents a position of the ruder 101 that accomplishes the desired yaw dampening (of step 222) or yaw increase or acceleration (of step 224) in accordance with the calculated gain (of step 226) via the interaction of aerodynamic forces with the rudder 101 in the desired position. In one embodiment, once the desired yaw raw (or driver intended yaw rate) is equivalent to the actual (or measured) yaw rate, the rudder 101 is returned to the nominal position (i.e. the first position 401 of FIGS. 4-6, described further below). Also in one embodiment, the rudder position command is generated by the processor 172 of FIG. 1.

In addition, in one embodiment, a determination is made as to a required change in position to move the rudder 101 from its current position to its desired position of step 228.

In one embodiment, this determination is made by the processor 172 of FIG. 1. The rudder 101 is then moved to the desired (or commanded) position (step 232). In one embodiment, the rudder 101 is moved by the actuator 105 of FIG. 1 in accordance with instructions provided by the processor 172 of FIG. 1. In one embodiment, once the desired yaw raw (or driver intended yaw rate) is equivalent to the actual (or measured) yaw rate, the rudder 101 is returned to the nominal position (i.e. the first position 401 of FIGS. 4-6, described further below).

Figure 3:
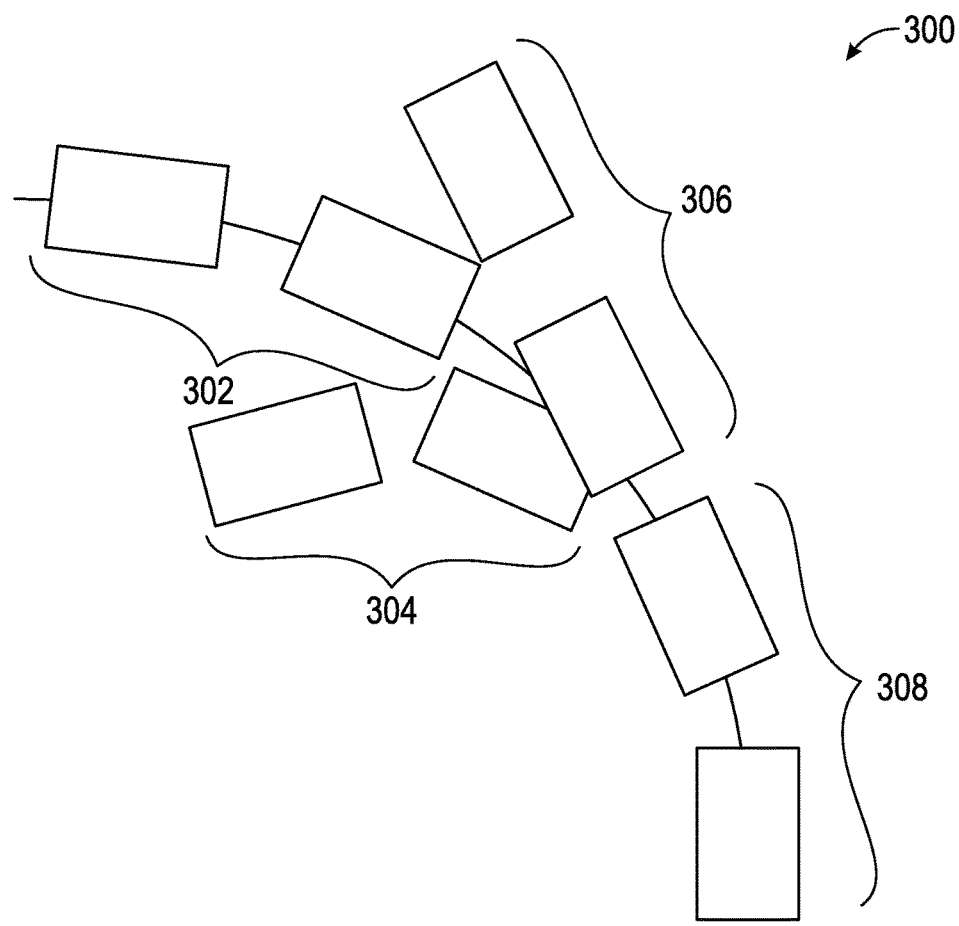
FIG. 3 is a schematic drawing of an implementation of the process of FIG. 2 in correcting oversteer or understeer of a vehicle, such as the vehicle of FIG. 1, in accordance with an exemplary embodiment.

With reference to FIG. 3, a schematic drawing is provided for an implementation of the process 200 of FIG. 2 in correcting oversteer or understeer of the vehicle, in accordance with an exemplary embodiment. With reference to the schematic illustration 300, regions 302 and 308 reflect movement of the vehicle 100 with respect to a driver's intended yaw rate during a first and second portion of a turn, respectively. Region 304 reflects movement of the vehicle 100 with a greater yaw rate than the driver's intended yaw rate (i.e. vehicle oversteer) during the first portion of the turn. Region 306 reflects movement of the vehicle 100 with a smaller yaw rate than the driver's intended yaw rate (i.e. vehicle understeer) during the first portion of the turn.

When the yaw rate is identical (or substantially identical) to the driver's intended yaw rate, as in region 302, no adjustment of the rudder 101 is necessary to attain the driver's intended yaw rate for the second portion of the turn in region 308 (i.e., corresponding to steps 218 and 220 from FIG. 2). When the yaw rate is larger (or significantly larger) than the driver's intended yaw rate, as in region 304, the rudder 101 is adjusted so as to dampen the yaw rate, in order to attain the driver's intended yaw rate for the second portion of the turn in region 308 (i.e., corresponding to steps 222 and 226-232 from FIG. 2). Conversely, when the yaw rate is smaller (or significantly smaller) than the driver's intended yaw rate, as in region 306, the rudder 101 is adjusted so as to cause an increase or acceleration in the yaw rate to attain the driver's intended yaw rate for the second portion of the turn in region 308 (i.e., corresponding to steps 224 and 226-232 from FIG. 2).

Figure 4:
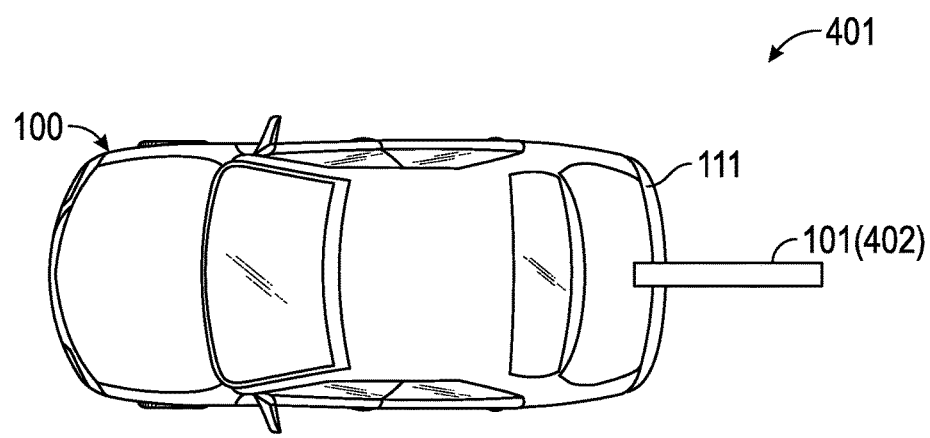
FIGS. 4-6 are schematic drawings showing a vehicle with a rudder that is configured and moved between multiple positions for controlling vehicle direction using aerodynamic forces, and that can be used in conjunction with the vehicle of FIG. 1, the process of FIG. 2, and the implementation of FIG. 3, in accordance with an exemplary embodiment.
Figure 5:
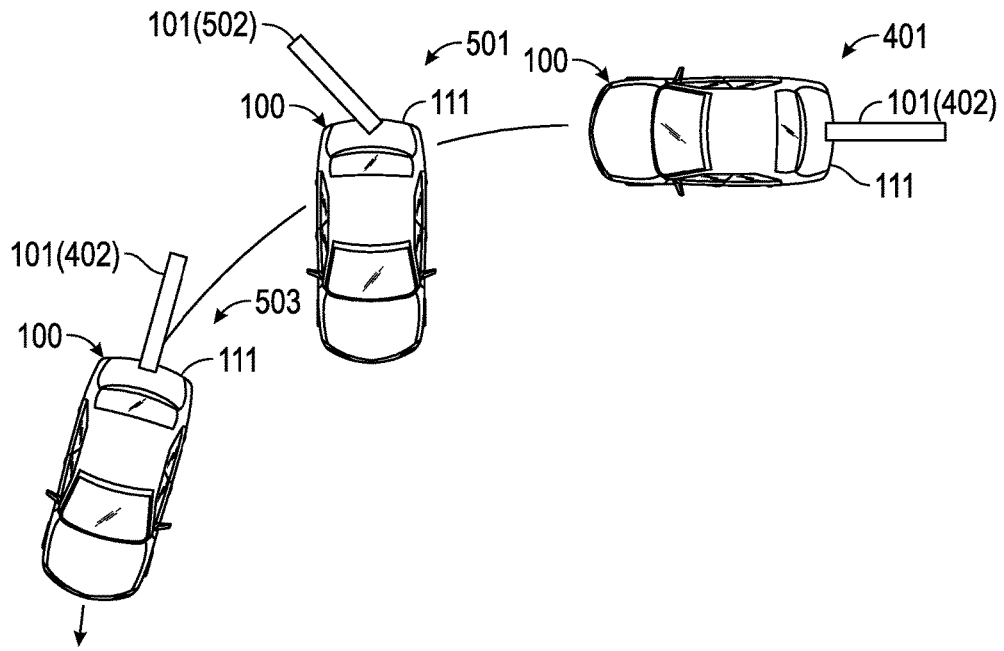
Figure 6:
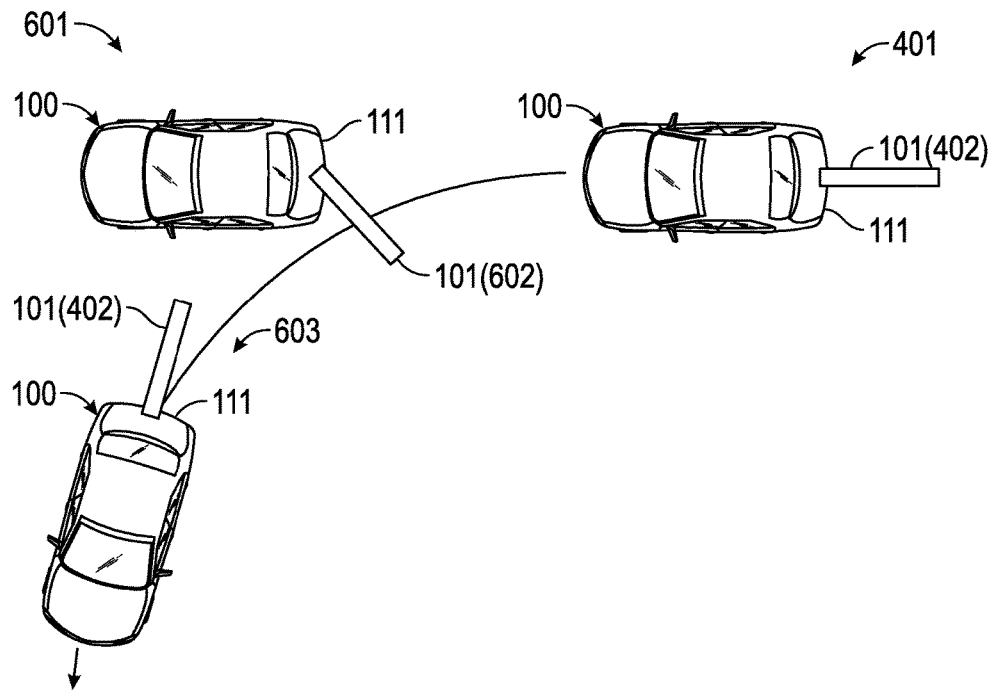

With reference to FIGS. 4-6, schematic drawings are provided for the vehicle 100 of FIG. 1 with exemplary positions of the rudder 101 of FIG. 1 for controlling vehicle direction using aerodynamic forces in accordance with the process 200 of FIG. 2, in accordance with an exemplary embodiment. Each of FIGS. 4-6 depict the rudder 101 mounted on the bumper beam 111 of the vehicle 100, in accordance with the embodiment discussed above.

FIG. 4 depicts the vehicle 100 of FIG. 1 in a first condition 401, in which there is no significant vehicle understeer or oversteer, in accordance with an exemplary embodiment. For example, in one embodiment, the first condition 401 corresponds to straight ahead driving for the vehicle 100. While the vehicle 100 is experiencing the first condition 401, the rudder 101 is placed in a first position 402, namely the above-discussed nominal position (also referred to herein as a "straight position"). In one embodiment, while in the first position 402, the rudder 101 is parallel to a "front to rear" direction of the vehicle 100 (and, in one embodiment, parallel to the movement of the vehicle 100). The first position 402 thus corresponds to the lowest amount of drag caused by the rudder 101 (in comparison to any other position).

FIG. 5 depicts the vehicle 100 of FIG. 1 in a second experiencing a vehicle oversteer condition, in accordance with an exemplary embodiment. As depicted in FIG. 5, the vehicle 100 begins in the first condition 401 of FIG. 4 (i.e. no significant oversteer or understeer). However, in FIG. 5 the vehicle 100 subsequently encounters an oversteer condition 501.

While the vehicle 100 is experiencing the oversteer condition 501, the rudder 101 is placed in a second position 502. In one embodiment, the rudder 101 is placed in the second position 502 by rotating the rudder 101 in a direction that is opposite to the direction of the turn of the vehicle 100. For example, in the illustration of FIG. 5 in which the vehicle 100 is experiencing an oversteer condition while making a left turn, the rudder 101 is rotated to the right to reach the second position 502, in order to generate yaw damping and a counteracting yaw moment on the vehicle 100. Similarly, by way of further example, if the vehicle 100 is experiencing an oversteer condition while making a right turn, the rudder 101 is rotated to the left to reach the second position 502, in order to generate the yaw damping and the counteracting yaw moment on the vehicle 100. In one embodiment, the rudder 101 forms an approximately forty five degree angle with a rear surface of the vehicle 100 while in the second position 502. However, this may vary in other embodiments, this may vary. In certain embodiments, the magnitude of the rotation may vary based on the amount of oversteer experienced by the vehicle 100 (e.g. the rudder 101 may be rotated farther based on relatively larger oversteer conditions, and rotated less based on relatively lesser oversteer conditions, in one embodiment).

Once the vehicle yaw is damped and the directional control is regained to maintain the driver's intended path for the vehicle 100 (i.e., once the oversteer condition 501 has ended, as depicted in condition 503 for the vehicle 100 in FIG. 5), the rudder 101 is moved back to its nominal (or straight) position 402.

FIG. 6 depicts the vehicle 100 of FIG. 1 in a second experiencing a vehicle understeer condition, in accordance with an exemplary embodiment. As depicted in FIG. 6, the vehicle 100 begins in the first condition 401 of FIG. 4 (i.e. no significant oversteer or understeer). However, in FIG. 6 the vehicle 100 subsequently encounters an understeer condition 601.

While the vehicle 100 is experiencing the understeer condition 601, the rudder 101 is placed in a third position 602. In one embodiment, the rudder 101 is placed in the third position 602 by rotating the rudder 101 in the same direction as the direction of the turn of the vehicle 100. For example, in the illustration of FIG. 6 in which the vehicle 100 is experiencing an understeer condition while making a left turn, the rudder 101 is rotated to the left to reach the third position 602, in order to generate yaw acceleration on the vehicle 100. Similarly, by way of further example, if the vehicle 100 is experiencing an understeer condition while making a right turn, the rudder 101 is rotated to the right to reach the third position 602, in order to generate the yaw acceleration on the vehicle 100. In one embodiment, the rudder 101 forms an approximately forty five degree angle with a rear surface of the vehicle 100 while in the third position 602. However, this may vary in other embodiments, this may vary. In certain embodiments, the magnitude of the rotation may vary based on the amount of understeer experienced by the vehicle 100 (e.g. the rudder 101 may be rotated farther based on relatively larger understeer conditions, and rotated less based on relatively lesser understeer conditions, in one embodiment).

Once the additional vehicle yaw is generated and the directional control is regained to maintain the driver's intended path for the vehicle 100 (i.e., once the understeer condition 601 has ended, as depicted in condition 603 for the vehicle 100 in FIG. 6), the rudder 101 is moved back to its nominal (or straight) position 402.

With further referenced to FIGS. 4-6, in one embodiment the entire rudder 101 moves when an oversteer or understeer condition is detected, thereby increasing the surface area available for aerodynamic force reactions and thus increasing the effectiveness of the rudder 101. Also in one embodiment, the dimensions of the rudder 101 are dependent upon the overall size, mass, and yaw inertia of the vehicle 101 to which it is attached, along with the desired yaw force corrections. In one example, the rudder has a width of approximately 0.5 meters along with a height of 0.5 meters. However, the dimensions of the rudder 101 may vary in different embodiments. In certain embodiments, the rudder 101 may have a relatively larger value for vehicles with a relatively larger yaw inertia, or vehicles for which increased performance may be desired, as compared with vehicles with a relatively smaller yaw inertia or for which increased performance may not be required. Conversely, in certain embodiments, if the yaw inertia of the vehicle is relatively smaller or decreased performance is necessary, then a reduced rudder size (e.g., height, width, and associated area) may be utilized. One example is Newton's second law equations can be applied to calculate the angular acceleration (yaw acceleration) of a given vehicle. The applicable equation is:

$$\alpha = \frac{\tau}{I},$$

in which "α" (alpha) represents angular acceleration, "τ" (tau) represents applied torque from the rudder 101 on the yaw axis of the vehicle 101, and "I" represents the aforementioned yaw inertia of the vehicle 101. The force on the rudder 101 is also proportional to the square of the velocity at which the vehicle 101 is operated, therefore the rudder can become particularly effective at correcting vehicle oversteer and understeer conditions at higher velocities of the vehicle 100.

It will be appreciated that the disclosed methods, systems, and vehicles may vary from those depicted in the Figures and described herein. For example, the vehicle 100, the rudder 101, the control system 102, and/or various components thereof may vary from that depicted in FIGS. 1, 4-6 and described in connection therewith. In addition, it will be appreciated that certain steps of the process 200 may vary from those depicted in FIGS. 2-6 and/or described above in connection therewith. It will similarly be appreciated that certain steps of the method described above may occur simultaneously or in a different order than that depicted in FIG. 2 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
obtaining a measured yaw rate for a land automobile driven on a roadway on land;
determining an intended yaw rate for the land automobile as the land automobile is driven on the roadway; and
moving a rudder of the land automobile, via instructions provided by a processor, based at least in part on a comparison between the measured yaw rate and the intended yaw rate as the land automobile is driven on the roadway;
wherein the step of moving the rudder comprises moving the rudder via instructions provided by the processor, as the land automobile is driven on the roadway, to:
a first direction, in which aerodynamic forces against the rudder dampen the land automobile's yaw rate, during an oversteer condition for the land automobile in which the measured yaw rate is greater than the intended yaw rate; and
a second direction, in which aerodynamic forces against the rudder increase the automobile's yaw rate, during an understeer condition for the land automobile in which the measured yaw rate is less than the intended yaw rate.

2. The method of claim 1, wherein:
the step of obtaining the measured yaw rate comprises obtaining the measured yaw rate from a yaw sensor of the land automobile as the land automobile is driven on the roadway; and
the step of determining the intended yaw rate comprises determining the intended yaw rate based on a measured steering angle of the land automobile as the land automobile is driven on the roadway.

3. The method of claim 1, further comprising:
determining a speed for the land automobile as the land automobile is driven on the roadway;
wherein the step of moving the rudder comprises moving the rudder as the land automobile is driven on the roadway, via instructions provided by the processor, based at least in part on:
the comparison between the measured yaw rate and the intended yaw rate; and
the speed of the land automobile.

4. The method of claim 3, wherein the step of moving the rudder comprises moving the rudder as the land automobile is driven on the roadway, via instructions provided by the processor:
a relatively greater amount as the speed increases; and
a relatively smaller amount as the speed decreases.

5. The method of claim 1, wherein the step of moving the rudder comprises moving the rudder via instructions provided by the processor to an actuator that is coupled to the rudder, to thereby move the rudder via the actuator in accordance with the instructions provided by the processor, as the land automobile is driven on the roadway.

6. The method of claim 5, wherein the actuator comprises a hydraulic actuator.

7. A land automobile configured to be driven on a roadway disposed on land, the land automobile comprising:
a body;
a rudder positioned on the body; and
a control system coupled to the rudder, the control system comprising:
a detection unit configured to obtain sensor data for the automobile as the land vehicle is driven on the roadway on land; and a processor coupled to the detection unit and configured to at least facilitate:
  obtaining a measured yaw rate for the automobile using the sensor data as the land vehicle is driven on the roadway on land;
  determining an intended yaw rate for the automobile using the sensor data as the land vehicle is driven on the roadway on land; and
  moving the rudder based at least in part on a comparison between the measured yaw rate and the intended yaw rate as the land vehicle is driven on the roadway on land;
wherein the processor is configured to move the rudder to:
  a first direction, in which aerodynamic forces against the rudder dampen the automobile's yaw rate, during an oversteer condition for the automobile in which the measured yaw rate is greater than the intended yaw rate as the land vehicle is driven on the roadway on land; and
  a second direction, in which aerodynamic forces against the rudder increase the automobile's yaw rate, during an understeer condition for the automobile in which the measured yaw rate is less than the intended yaw rate as the land vehicle is driven on the roadway on land.

8. A system comprising:
a detection unit configured to obtain sensor data for a land automobile driven on a roadway on land; and
a processor coupled to the detection unit and configured to at least facilitate:
  obtaining a measured yaw rate for the land automobile using the sensor data;
  determining an intended yaw rate for the land automobile using the sensor data; and
  moving a rudder of the land automobile based at least in part on a comparison between the measured yaw rate and the intended yaw rate;
wherein the processor is configured to move the rudder to:
  a first direction, in which aerodynamic forces against the rudder dampen the land automobile's yaw rate, during an oversteer condition for the land automobile in which the measured yaw rate is greater than the intended yaw rate; and
  a second direction, in which aerodynamic forces against the rudder increase the land automobile's yaw rate, during an understeer condition for the land automobile in which the measured yaw rate is less than the intended yaw rate.

9. The system of claim 8, wherein the detection unit comprises:
a yaw sensor configured to measure the measured yaw rate; and
a steering angle sensor configured to measure a steering angle of the land automobile;
wherein the processor is configured to determine the intended yaw rate using the steering angle.

10. The system of claim 8, wherein the processor is further configured to at least facilitate:
  determining a speed for the land automobile using the sensor data; and
  moving the rudder based at least in part on:
    the comparison between the measured yaw rate and the intended yaw rate; and
    the speed of the automobile.

11. The system of claim 8, further comprising:
an actuator coupled to the processor and configured to move the rudder via instructions provided by the processor.

12. The system of claim 11, wherein the actuator comprises a hydraulic actuator.

13. The land automobile of claim 7, wherein the control system further comprises:
an actuator coupled to the processor and configured to move the rudder via instructions provided by the processor as the land vehicle is driven on the roadway on land.

14. The land automobile of claim 13, wherein the actuator comprises a hydraulic actuator.

15. The land automobile of claim 7, wherein the detection unit comprises:
  a yaw sensor configured to measure the measured yaw rate as the land vehicle is driven on the roadway on land; and
  a steering angle sensor configured to measure a steering angle of the land automobile as the land vehicle is driven on the roadway on land;
wherein the processor is configured to determine the intended yaw rate using the steering angle as the land vehicle is driven on the roadway on land.

16. The automobile of claim 7, wherein the processor is further configured to at least facilitate:
  determining a speed for the land automobile using the sensor data as the land vehicle is driven on the roadway on land; and
  moving the rudder as the land vehicle is driven on the roadway on land based at least in part on:
    the comparison between the measured yaw rate and the intended yaw rate as the land vehicle is driven on the roadway on land; and
    the speed of the land automobile as the land vehicle is driven on the roadway on land.

17. The land automobile of claim 7, wherein the rudder is positioned on a rear portion of the body.

* * * * *